(12) United States Patent
Margolin et al.

(10) Patent No.: US 12,475,322 B2
(45) Date of Patent: Nov. 18, 2025

(54) TRAINING OF A TEXT CLASSIFICATION MODEL FROM LONG TEXT AND BASED ON TEXT SEMANTICS

(71) Applicant: Intuit Inc., Mountain View, CA (US)

(72) Inventors: Itay Margolin, Petach Tikva (IL); Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 184 days.

(21) Appl. No.: 18/427,566

(22) Filed: Jan. 30, 2024

(65) Prior Publication Data

US 2025/0245436 A1  Jul. 31, 2025

(51) Int. Cl.
  *G06F 40/30* (2020.01)
  *G06F 40/284* (2020.01)
  *G06N 20/00* (2019.01)

(52) U.S. Cl.
  CPC ............ *G06F 40/30* (2020.01); *G06F 40/284* (2020.01); *G06N 20/00* (2019.01)

(58) Field of Classification Search
  CPC ...... G06F 40/284; G06F 40/30; G06F 40/274; G06F 40/35; G06F 40/40; G06N 20/00; G06N 3/045; G06N 3/0464; G06N 3/08; G06N 7/01; G06N 3/044
  USPC .......................................................... 704/9
  See application file for complete search history.

(56) References Cited

U.S. PATENT DOCUMENTS

| | | | | |
|---|---|---|---|---|
| 2008/0312901 | A1* | 12/2008 | Torii | G06F 3/0237 704/2 |
| 2017/0308790 | A1* | 10/2017 | Nogueira Dos Santos | G06N 3/045 |
| 2023/0016365 | A1* | 1/2023 | Qiu | G06F 40/30 |
| 2023/0169362 | A1* | 6/2023 | Beucher | G06N 3/096 706/12 |
| 2023/0222149 | A1* | 7/2023 | Dell | G06N 7/01 715/254 |
| 2024/0111794 | A1* | 4/2024 | Osuala | G06F 16/3323 |
| 2024/0168472 | A1* | 5/2024 | Edwards | H04L 41/16 |
| 2024/0303434 | A1* | 9/2024 | Shah | G06F 9/451 |
| 2025/0086215 | A1* | 3/2025 | Kumar | G06F 16/345 |
| 2025/0156642 | A1* | 5/2025 | Serry | G06F 40/284 |

(Continued)

OTHER PUBLICATIONS

Pappagari et al., "Hierarchical Transformers for Long Document Classification," 2019 IEEE Automatic Speech Recognition and Understanding Workshop (ASRU), Singapore, pp. 838-844, doi: 10.1109/ASRU46091.2019.9003958. (Year: 2019).

*Primary Examiner* — Vijay B Chawan
(74) *Attorney, Agent, or Firm* — Paradice & Li LLP

(57) ABSTRACT

Systems and methods are disclosed for training a text classification model based on long text and known semantics as training data. With a text classification model limited as to the amount of text that may be input at one time, long text that is greater than the limit may be segmented into smaller segments that are less than the limit (such as into sentences). Each segment of the long text is compared with sample segments with known impact of specific semantics to associate the long text segments with the specific semantics. To compare the long text segments with sample segments, an embedding model generates an embedding from each of the segments so that the embeddings may be compared. With the long text segments associated with specific semantics, the long text segments and the associated semantics are used as training data to train a text classification model.

20 Claims, 5 Drawing Sheets

(56) References Cited

U.S. PATENT DOCUMENTS

2025/0165703 A1\* 5/2025 S ........................... G06F 40/109
2025/0245436 A1\* 7/2025 Margolin ................ G06F 40/30

\* cited by examiner

TRAINING OF A TEXT CLASSIFICATION MODEL FROM LONG TEXT AND BASED ON TEXT SEMANTICS

TECHNICAL FIELD

This disclosure relates generally to the training of a text classification model, including the training of a text classification model from training data including long texts and based on text semantics.

DESCRIPTION OF RELATED ART

A text classification model classifies text into defined categories. If the text classification model is a machine learning (ML) model, the text classification model is trained with text labeled with the category known for the text. For example, the text is input to the text classification model, the text classification model classifies the text into a category, and any error between the output classification of the text classification model and the labeled category is used to adjust the model in order to reduce the error between the categorizations from the model and the labeled categorizations for the text. With the text classification model being trained, the text classification model is able to be used to classify new texts input to the model.

SUMMARY

Systems and methods are disclosed for training a text classification model. In particular, disclosed herein are systems and methods to train a text classification model using long text (such as hundreds of thousands of text tokens) and based on text semantics associated with the categories to which the text classification model is to be trained to classify. Since text classification models have a maximum text input limit, long text that is greater than the limit but is to be used to train a text classification model may be segmented into smaller segments that are less than the limit (such as into sentences). A system stores a list of sample segments with known specific semantics, and with the long text segmented, each segment of the long text is compared with the sample segments to associate the long text segments with sample segments and thus the associated semantics. To compare the long text segments with sample segments, an embedding model generates an embedding from each of the long text segments and sample segments, and the system compares the embedding for a long text segment to each of the embeddings for the sample segments (such as determining a distance between each pair of embeddings). The system then compares, for each long text segment, the distances calculated across the sample segments to identify the minimum distance and associate the long text segment with the sample segment corresponding to the minimum distance, and the semantic associated with the sample segment is associated with the long text segment (such as the distance measure calculated being the associated semantic). The long text segments and the associated semantics are then used as training data to train a text classification model.

One innovative aspect of the subject matter described in this disclosure can be implemented as a computer-implemented method for training a text classification model. The method includes obtaining an electronic text, with the electronic text being associated with a label indicating a desired classification of the electronic text. The method also includes segmenting the electronic text into a plurality of first segments and generating, by a text embedding model, a plurality of first embeddings from the plurality of first segments. The method further includes obtaining a plurality of second embeddings generated by the text embedding model from a plurality of second segments of text associated with one or more known classifications. The method also includes training a text classification model based on the plurality of associations using supervised learning. Training the text classification model includes: providing the plurality of first segments and the plurality of associations as an input to the text classification model; generating, by the text classification model, a plurality of classifications from the plurality of first segments based on the plurality of associations; and adjusting the text classification model based on the label associated with the electronic text. With the text classification model trained, the method further includes obtaining a second electronic text to be classified by the trained text classification model, providing the second electronic text to the trained text classification model, and generating, by the trained text classification model, a classification of the second electronic text.

Another innovative aspect of the subject matter described in this disclosure can be implemented in a system for training a text classification model. An example system includes one or more processors and a memory storing instructions that, when executed by the one or more processors, cause the system to perform operations. The operations include obtaining an electronic text, with the electronic text being associated with a label indicating a desired classification of the electronic text. The operations also include segmenting the electronic text into a plurality of first segments and generating, by a text embedding model, a plurality of first embeddings from the plurality of first segments. The operations further include obtaining a plurality of second embeddings generated by the text embedding model from a plurality of second segments of text associated with one or more known classifications. The operations also include training a text classification model based on the plurality of associations using supervised learning. Training the text classification model includes: providing the plurality of first segments and the plurality of associations as an input to the text classification model; generating, by the text classification model, a plurality of classifications from the plurality of first segments based on the plurality of associations; and adjusting the text classification model based on the label associated with the electronic text. With the text classification model trained, the operations further include obtaining a second electronic text to be classified by the trained text classification model, providing the second electronic text to the trained text classification model, and generating, by the trained text classification model, a classification of the second electronic text.

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
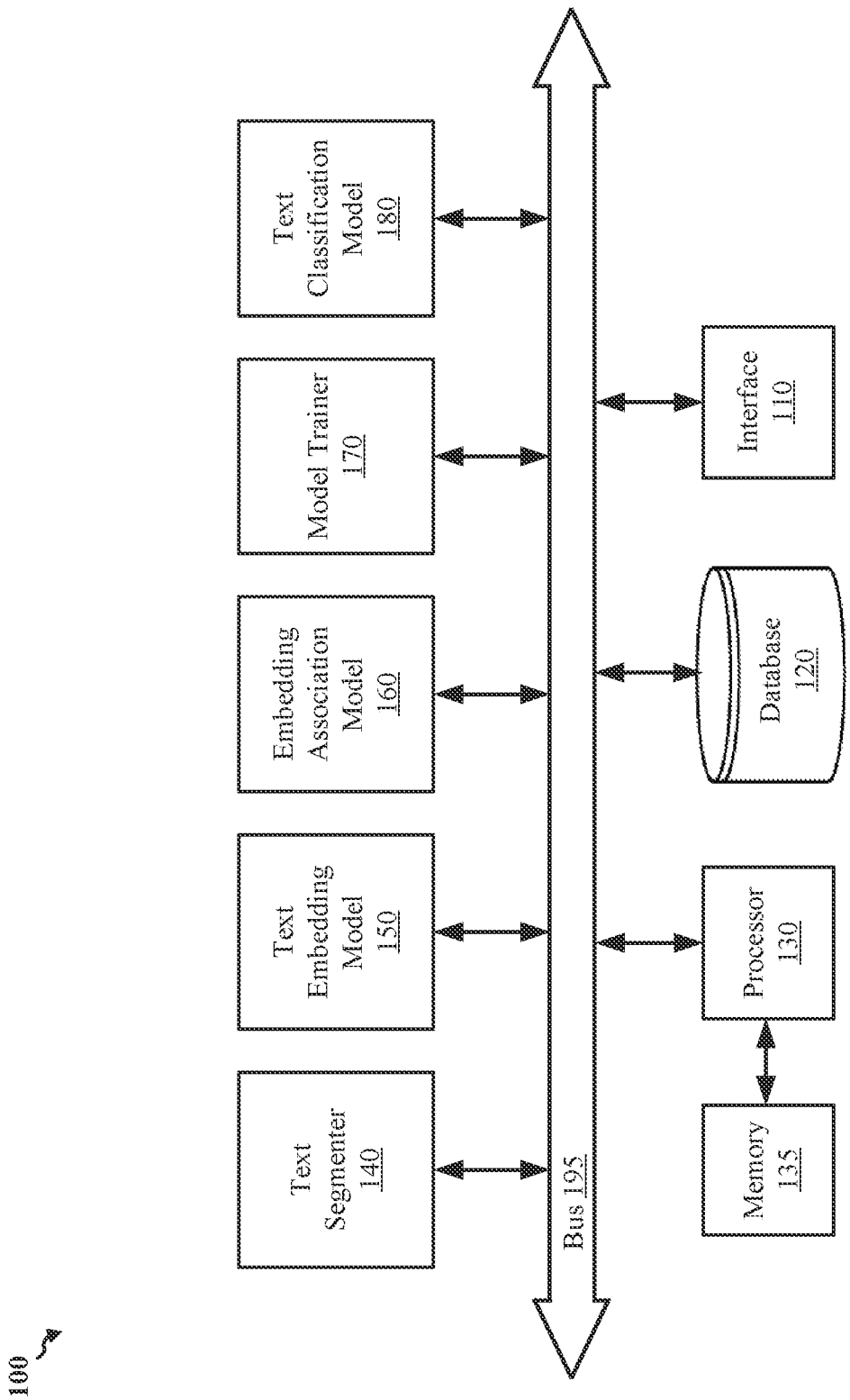
FIG. 1 shows an example system for training and applying a text classification model, according to some implementations.

Implementations of the subject matter described in this disclosure may be used for training a text classification model, including the use of long text and text semantics to train the text classification model. To note, any text classification model may be trained, and the text classification model may classify text into any suitable categories and any suitable number of categories. As used herein, long text refers to text that is larger than the maximum input to the text classification model. For example, many text classification models are limited to a 512 token input (such as tokens being words in the text, and the input thus being limited to 512 words), and long text may refer to a block of text that is greater than 512 tokens. Typically, long text is significantly greater than 512 tokens. For example, text from a webpage may be obtained, and the text may have tens of thousands or hundreds of thousands of tokens (such as words). Also as used herein, a text semantic refers to an indication or measure of impact on the categorization of a text segment. For example, the text classification model may be trained to classify text from a webpage into categories of the text including an error message or the text not including an error. An example text segment from text in a webpage may be "The username or the password is incorrect," which indicates that the webpage text most likely includes an error, and the semantic associated with the text segment is an indication that the existence of the text segment in webpage text has a significant impact in that the webpage text most likely includes an error. For text classification model training, in some implementations, the semantic may be a context input to the text classification model, with the text classification model being configured to receive the semantic as a context input concurrently with the associated long text segment being received as an input. Herein, "classification" and "categorization" may be used interchangeably.

Text classification models classify texts into predefined categories for various functions. For example, a text classification model may classify texts in product reviews into ratings (such as a 1-5 review scale or a positive or negative review classification) to analyze the sentiment associated with a product. In another example, a text classification model may classify text from social media or community websites for content moderation (such as to classify whether a message includes sensitive information). In a further example, a text classification model may classify text from a document to classify the document into a specific knowledge base (such as into specific scientific categories for a scientific journal). Other functions may include text classification for analyzing survey responses, classifying instant messages or emails into low or high priority for response, and categorizing client support requests or tickets for action.

As noted above, a text classification model has an input limit on the amount of text that may be provided to the model for classification. For example, most text classification models have a 512 token limit. However, the text to be classified by the text classification model and texts that can be used to train the text classification model may be greater than the 512 token limit. For example, a text classification model is to be trained to detect whether a webpage includes user associated errors (referred to herein as errors). As used herein, an error may refer to a response in the webpage to a user action that alerts the user as to an issue or is requesting follow-up from the user. For example, on a login page, a user may be requested to enter a username and password and select a login button. If the user selects the login button before entering the username and password, the webpage shown to the user may respond with including a new text of "Please enter your username and password before continuing." Such a sentence indicates that the webpage includes an error that alerts the user to the action of entering his or her credentials that needs to be performed. In another example, if the user enters an incorrect username or password, the webpage may response with including a new text of "The username or the password is incorrect." Such a sentence indicates that the webpage includes an error that alerts the user to the action of correcting the username or password that needs to be performed. Such webpages may include text that is significantly more than 512 tokens. For example, if a token is a word of text, a webpage including an error may have hundreds of thousands of words/tokens.

A programmer could attempt to program a text classification model to accept a larger text input. For example, a programmer may increase the input limit to 1024, 2048, or even more tokens for the text classification model. However, increasing the input limit increases the required memory and time to execute the text classification model exponentially. For inputs in the tens of thousands or even hundreds of thousands of tokens, the processing resources and time required to execute a text classification model programmed to accept such a large input may be technically and financially impossible.

As such, there is a need to train text classification models (such as having a maximum input of 512 tokens) using long texts without increasing the input limits to the text classification model.

In addition, typical training of a text classification model is based on the existence, the patterns, and/or the sequences of specific tokens without attention to the context of those tokens. For example, the sentence "It is red" has different contexts based on what is "it." If "it" is a rose, a red rose may provide context as to beauty or a happy scenario, such as a spouse's birthday or anniversary. In comparison, if "it" is a traffic light, a red traffic light may provide context as to caution or warning that a car needs to stop or not proceed through the traffic light.

As such, it would be beneficial for a text classification model to be trained based on text semantics such that the text classification model is context aware for classifications, thus improving the performance of the text classification model.

As described herein, a system is configured to train a text classification model using long text and based on known text semantics. With a text classification model limited to the amount of text that may be input at one time, a system may segment a long text into smaller text segments that are less than the input limit to the text classification model. The system also stores sample segments with a known semantic (which may be manually compiled and/or compiled through previous processing and association of text segments to specific semantics), and the system compares each text segment of the long text with the sample segments to associate at least some long text segments with a sample segment and thus the sample segment's associated semantic. With at least some long text segments associated with specific semantics, the long text segments and the associated semantics are used as training data to train a text classification model. With the text classification model trained, the text classification model may be used to classify any text intended to be classified (including long texts).

Various implementations of the subject matter disclosed herein provide one or more technical solutions to the training of machine learning (ML) based text classification models. As such, various aspects of the present disclosure provide a unique computing solution to a unique computing problem that did not exist prior to ML models. The training of specific machine learning technology (including text classification models) as described herein cannot be performed in the human mind, much less practically in the human mind, including the use of pen and paper. In addition, the, e.g., hundreds of thousands of tokens of a long text that are efficiently and objectively processed to generate a training data to train the text classification model cannot be performed practically in the human mind, including the use of pen and paper.

FIG. 1 shows an example system 100 for training and applying a text classification model 180, according to some implementations. The system 100 includes an interface 110, a database 120, a processor 130, a memory 135 coupled to the processor 130, a text segmenter 140, a text embedding model 150, an embedding association model 160, a model trainer 170, and a text classification model 180. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain or provide electronic text for classification, text segments, embeddings generated from the text segments, the text classification model 180 to be trained or after training, hyperparameters of the text classification model 180, sample text segments associated with specific semantics, or other data to be stored or stored on the system 100. The interface 110 may also receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices. For example, the system 100 may be remote to a server hosting a webpage or website that is to be classified by the text classification model 180. The system 100 may connect to the server via the interface 110 and obtain the text from a webpage (such as by scraping the webpage). In another example, the system 100 may be remote to a user device for a user interacting with the text classification model 180 or a program interacting with the text classification model 180 (such as a program to indicate to a user that a webpage being visited by the user includes an error, including, e.g., text requesting the user to perform an action to confirm that the user is human). Prompts may be provided to the user device via the interface 110 and through the internet, and responses or other inputs may be received from the user device through the internet and via the interface 180.

The database 120 may store the electronic text obtained via the interface 110, any inputs received from a user device or another device via the interface 110, the text segments generated by the text segmenter 140, the embeddings generated by the text embedding model 150, the sample segments associated with specific semantics regarding the categorization, the associations between text segments and sample segments or semantics corresponding to those sample segments as generated by the embedding association model 160, the distances calculated between the text segment embeddings and sample segment embeddings by the embedding association model 160 for use in generating the associations, the labels associated with the long texts for supervised learning, or adjustments to be performed or performed and hyperparameters of the model trainer 170 for training the text classification model 180. The database 120 may also store hyperparameters configured for the text classification model 180 or any models used in the components 140-170 or other computer executable instructions or data for operation of the system 100. In some implementations, the database 120 may include a relational database capable of presenting information (such as the text segment associations and categorizations by the text classification model for those text segments) as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the text segmenter 140, the text embedding model 150, the embedding association model 160, the model trainer 170, and the text classification model 180. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store one or more applications, the text segmenter 140, the text embedding model 150, the embedding association model 160, the model trainer 170, and the text classification model 180 that may be executed by the processor 130. The memory 135 may also store inputs, outputs, or other information associated with the components 140-180 of the system 100 or any other data for operation of the system 100. In some implementations, hardwired circuitry may be used in place of, or in combination with, software instructions to implement aspects of the disclosure.

The text segmenter 140 is to segment electronic text (such as long text obtained by the interface 110) into text segments of a size less than the maximum input size to the text classification model 180. In some implementations, the size of the text segments to be generated by the text segmenter 140 are sentences. In this manner, each text segment is a sentence from the overall electronic text (also referred to herein as long text). In some other implementations, the size of the text segments may be a fixed token size, such as 20 tokens or 50 tokens, a fixed character size, or another suitable segment size. To note, the text segmenter 140 may include a tokenizer (or alternatively the tokenizer may be a separate component of the system 100) to tokenize the electronic text into tokens for segmentation. As such, in some implementations, the text segmenter 140 may tokenize and segment long text into a plurality of sentence-long text segments. In some other implementations, the text embedding model 150 may perform the tokenization, and the text segmenter 140 may segment the text based on punctuation but leave the characters without tokenizing.

The text embedding model 150 is to generate an embedding from a text segment. For example, a sentence output by the text segmenter 140 may be provided to the text embedding model 150 as an input, and the text embedding model 150 may generate a token vector representing the sentence. In some implementations, the embeddings may be of a fixed length (such as a token vector of, e.g., 128 values), with the length being a model parameter of the text embedding model. To note, the model parameter may be fixed (such as hard coded into the model) or adjustable (such as a parameter that may be defined by a user).

The text embedding model 150 may also normalize the generated embeddings. If the embeddings are normalized, the embeddings are able to be compared to each other (such as to calculate a distance between embeddings, such as described herein with reference to the embedding association model 160).

In some implementations, the text embedding model 150 may be a natural language processor (NLP) configured to tokenize and vectorize the input text to generate a normalized embedding. For example, the text embedding model 150 may include a bidirectional encoder representations from Transformers (BERT) model, or may include any suitable variant of the BERT model, such as a robustly optimized BERT pretraining approach (RoBERTa) model, a lite version of BERT (ALBERT) model, a distilled version of BERT (DistilBERT) model, and so on. Alternatively, a different suitable NLP may be used to generate the embeddings from the text input. As such, the text embedding model 150 generates an embedding for each text segment of a long text, with each text segment being provided as an input to the embedding association model 160.

The system 100 also stores a plurality of sample embeddings with known semantics regarding the categories to which the text classification model 180 is to classify text. For example, the database 120 may store a list of sentences that correlate to the classification of the overall text. For example, if the text classification model 180 is used to identify errors in a webpage or otherwise classify that a webpage text includes an error, the list of sample embeddings may include sentences that correspond to the existence of an error, such as "The username or password is incorrect," "Please enter your login credentials before continuing," "Please check the captcha box to confirm that you are human," and "To confirm your identity, please answer the following security questions." As can be seen, the sentences indicate an alert to a user or prompt for a user action.

In some implementations, the list of sample segments is manually generated by one or more subject matter experts that have knowledge of the text segments that appear in various texts (such as the error messages that appear in various webpages). Additionally or alternatively, the list of sample segments may be generated by automatically adding text segments identified from a text as being associated with a specific semantic. For example, the system 100 may identify a new sentence that is similar to another sample sentence in the list, and the system 100 may add the new sentence to the list. A user may also add sample segments based on text encountered by the user that the user believes should be added to the list.

In addition to the sample segments themselves, the list may also include the semantic associated with the sample segment. For example, if the text classification model 180 is to identify errors in a webpage, the semantic may be whether or not a segment is associated with an error or otherwise indicates that an error is likely to exist in a webpage. In some implementations, a semantic measure may be stored in the list for each sample segment (such as a value, a word, or another suitable indication) indicating whether the segment is associated with an error (or that the segment impacts classification to a specific categorization for other text categorization problems). If the text classification model 180 classifies text into one of a plurality of categories, such as each category being associated with a different type of error that may occur in webpage text (such as the categories of, e.g., an "incorrect credentials" error versus an "actions to confirm you are human" error versus a "security follow-up" error), a semantic may indicate a specific category to which the text segment is associated. In some implementations of a binary text classification model 180 (such as indicating whether or not an error exists in a long text), the existence of the sample segment in the list may imply a positive semantic regarding the segment (such as an error existing), and a separate value may not need to be stored as the existence of the segment in the list is the semantic.

In some implementations, if a separate semantic is to be stored, the semantic may indicate a strength of correlation between the segment and a categorization. For example, in continuing the identification of webpage errors implementation, some sentences may occur in the normal text of a webpage as well as for an error. Such sentences may have less correlation to a categorization than other sentences that appear almost always exclusively for an error. As such, the semantic/label of the text segment in the list may include, e.g., an indication of the correlation. For example, a semantic may be a value on a scale from 0 to 1 to indicate the correlation between the text segment and the classification (such as 0 being no correlation and 1 being an exact correlation).

In addition to generating embeddings from the long text segments generated by the text segmenter 140, the text embedding model 150 also generates an embedding for each sample embedding included in the list of sample embeddings and stored on the system 100 (such as in the database 120). In some implementations, the text embedding model 150 generates an embedding for each new sample segment one time, with the embedding stored by the system 100 for later use by the embedding association model 160. The embeddings may be stored in the database 120. In some implementations, the embeddings may be stored in the list of sample embeddings, which may be a table with each row corresponding to a segment and each column corresponding to different aspects of the segment (such as one column storing the text of the segment, one column storing the semantic corresponding to the segment (if a semantic is to be stored), and one column storing the embedding generated for the sample). In some implementations, the embeddings may be stored separately from the list. For example, a separate table or storage object of the embeddings may be stored in the database 120, and the separate table or object may have relationships defined between the embeddings and the list of sample segments so that the system 100 is able to look up and retrieve the embedding corresponding to a sample segment for use by the embedding association model 160.

The embedding association model 160 is to associate a first set of embeddings to a second set of embeddings. For example, the embedding association model 160 associates embeddings from long text segments (referred to as long text embeddings) to embeddings from sample segments (referred to as sample embeddings). If the text embedding model 150 normalizes the embeddings, the embedding association model 160 is able to compare embeddings as the embeddings have the same vector length and have values on a common scale. In some implementations, the embedding association model 160 identifies the closest sample embedding for each long text embedding. If a sample embedding is similar to a long text embedding, then the corresponding sample segment is similar to the corresponding long text segment. As such, the long text segment may be associated with the semantic associated with the sample segment. In this manner, the embedding association model 160 associates embeddings in order to associate the corresponding segments and thus associate the corresponding long text segments with known semantics associated with the sample segments in the list.

In some implementations, the existence of the sample segment in the list indicates that the segment directly impacts classification of the overall text. As such, the semantic may be inferred to be a value of 1 on a scale from 0 to 1 (thus indicating a direct correlation). Associating a long text segment with a sample segment may include calculating a difference between the long text segment and the sample segment, with the difference corresponding to a percentage of the 1 value. As the segments increasingly differ from each other, the corresponding semantic value to be associated with the long text segment approaches 0 (thus indicating that the long text segment is decreasingly likely to impact classification). To calculate a difference between segments, the system 100 may calculate a difference between embeddings generated from those segments.

To associate a long text embedding with a sample embedding, the embedding association model 160 may calculate a distance between the long text embedding and each sample embedding based on vector arithmetic. The embedding association model 160 may then identify the minimum distance calculated to identify the sample embedding that may be associated with the long text embedding and thus the semantic to be associated with the long text embedding. A semantic associated with a long text segment may be based on the distance between the corresponding long text embedding and the closest sample embedding. For example, the distance metric calculated (which may thus indicate a percentage or portion of the long text segment's impact on classification compared to the sample segment's impact on classification) may be the semantic to be associated with the long text segment. As such, as the minimum distance between a long text segment and any of the sample segments increase, the semantic associated with the long text segment indicates that the long text segment is less and less likely to impact classification. To note, the embedding association model 160 may attempt to associate each long text embedding with one of the sample embeddings based on a minimum distance. Further details regarding the association of embeddings are described below with reference to FIGS. 2-4.

The long text segments may be stored in the database 120, such as in a list for the long text. For example, the long text segments may be stored in a table similar to a table storing the sample segments. With the embedding association model 160 identifying semantics to be associated with the long text segments (such as a value indicating a distance between the long text segment and the closest sample segment), the system 100 may store the semantics in the list of long text segments, such as similar to the list of sample segments described above. The list of long text segments and any defined semantics associated with the long text segments are to be used as training data for training the text classification model 180. In this manner, the text classification model 180 may include post-processing of the categorizations of the long text segments (such as including a means to combine the segment categorizations) to generate an overall categorization for the long text. As such, the text classification model 180 may be configured to receive the semantics as context inputs for the corresponding long text segments input to the text classification model 180. For example, if each sample segment is associated with a semantic of 1 indicating a direct impact on classification, each long text segment may be associated with a percentage from 0 to 1 indicating its similarity to any of the sample text segments and thus the long text segment's impact on classification.

The model trainer 170 is to train the text classification model 180. As noted above, the training data used to train the text classification model 180 includes the long text segments and the known semantics associated with the long text segments. With the text classification model 180 being configured to generate a categorization of the overall long text, the semantics associated with the long text segments may be provided as context inputs to the text classification model 180. Referring to the text classification model 180, the model may be configured to receive a text segment within the token input limit that is to be categorized, and the model may also be configured to receive a semantic as a concurrent context input for the text segment being input. The text classification model 180 may also be configured to generate a categorization of the overall text based on the categorizations of the text segments of such text. In this manner, the context inputs may be used to provide further data to the text classification model 180 to improve training of the model and performance of the model. For training the text classification model 180 configured to receive a semantic as an input, a loss function may measure a difference between the label of the overall text indicating the desired categorization for the text and the generated categorization for the overall text from the text classification model 180. As such, supervised learning may be used to train the text classification model 180 using a plurality of long texts.

The text classification model 180 may be any suitable machine learning (ML) based classification model. In some implementations, the text classification model 180 is a decision tree classifier, which may include any suitable variant of a decision tree, including a random forest, boosted decision trees (e.g., XGBoost), bagged decision trees, and so on. In some other implementations, the text classification model 180 includes another classification model, such as support vector machines (SVMs), a model based on Naïve Bayes, and so on. As noted above, in some implementations, the text classification model 180 is configured to receive a text segment and a semantic as inputs in order to generate a categorization for the text segment. The text classification model 180 may also be configured to generate a categorization of the overall text based on the categorizations of the text segments of the overall text. For example, the text classification model 180 (such as a decision tree classifier) may include post-processing of the text segment categorizations across the overall text to generate a categorization of the overall text (such as by ORing the categorizations or otherwise combining the categorizations). For example, if the text classification model 180 classifies a text segment into categories of whether or not an error exists, the text classification model 180 may include a logical OR operation across the classifications of the text segments such that if at least one text segment is classified as including an error, the overall text is classified as including an error.

After training of the text classification model 180 is completed by the model trainer 170, the system 100 may apply the trained text classification model 180 to any new text for which the model is to classify. For example, if the text classification model 180 is trained to classify text in a webpage (such as to identify errors), the system 100 may access the webpage and scrape the text from the webpage, segment the text into text segments by the text segmenter 140, and classify the text segments into categories by the text classification model 180. The system 100 (such as the text classification model 180) may thus use the classifications of the text segments to classify the overall text. If the text classification model 180 is also configured to receive semantics as inputs, the text embedding model 150 and the embedding association model 160 may also be used to associate a text segment with a semantic so that the associated segment may be provided as an input to the text classification model 180. Additionally or alternatively, the classifications of the text segments may be used by the system 100 to identify the specific text in the webpage that is identified as being associated with an error.

While the text segmenter 140, the text embedding model 150, the embedding association model 160, the model trainer 170, and the text classification model 180 are depicted as separate components of the system 100 in FIG. 1, the components 140-180 may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein. If the components are software, the components may be implemented using any suitable computer readable language. For example, each of the components 140-180 and the configuration and interoperability of such components may be programmed in the Python programming language using any suitable libraries.

Figure 2:
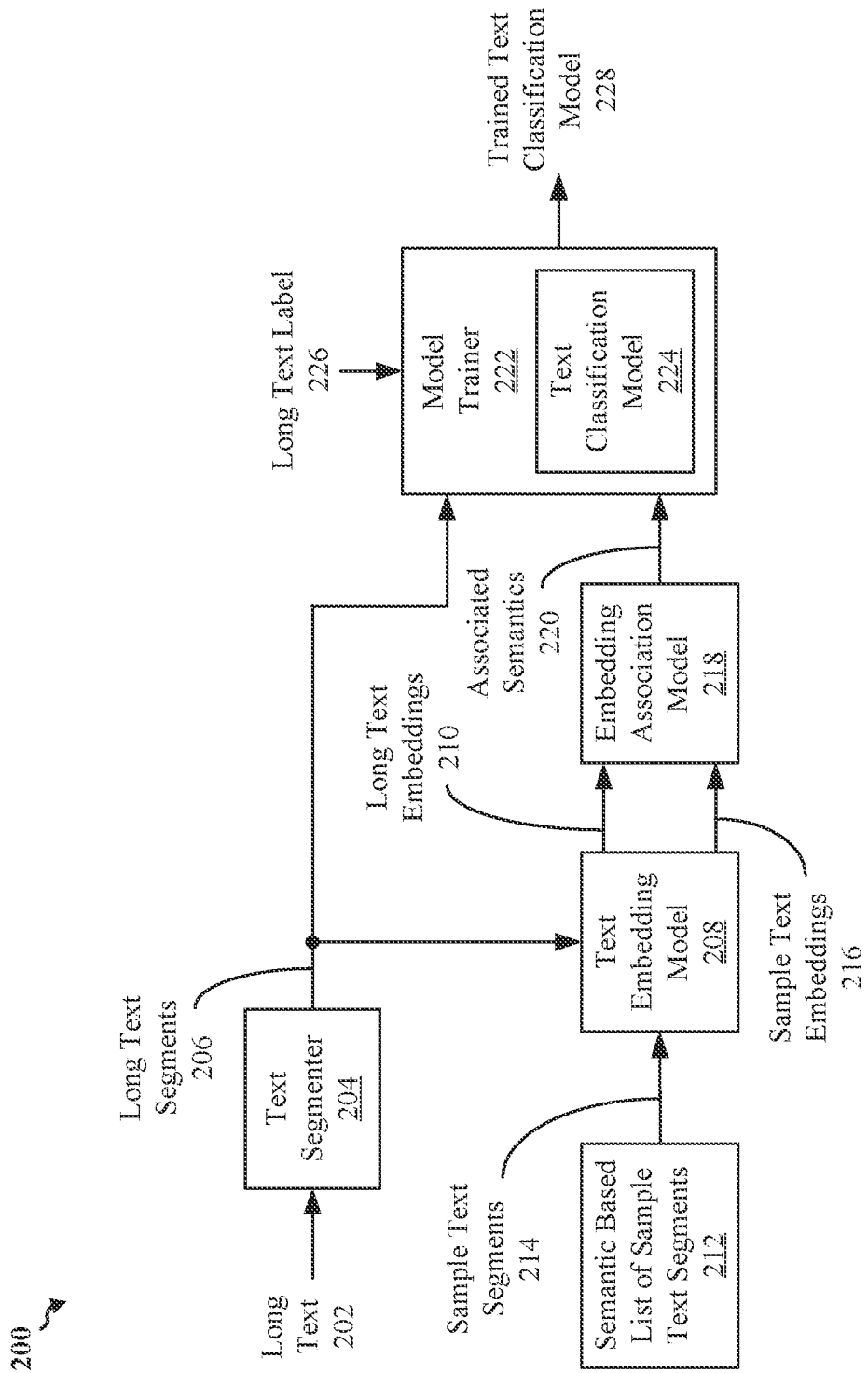
FIG. 2 shows an example block diagram for training a text classification model, according to some implementations.
Figure 3:
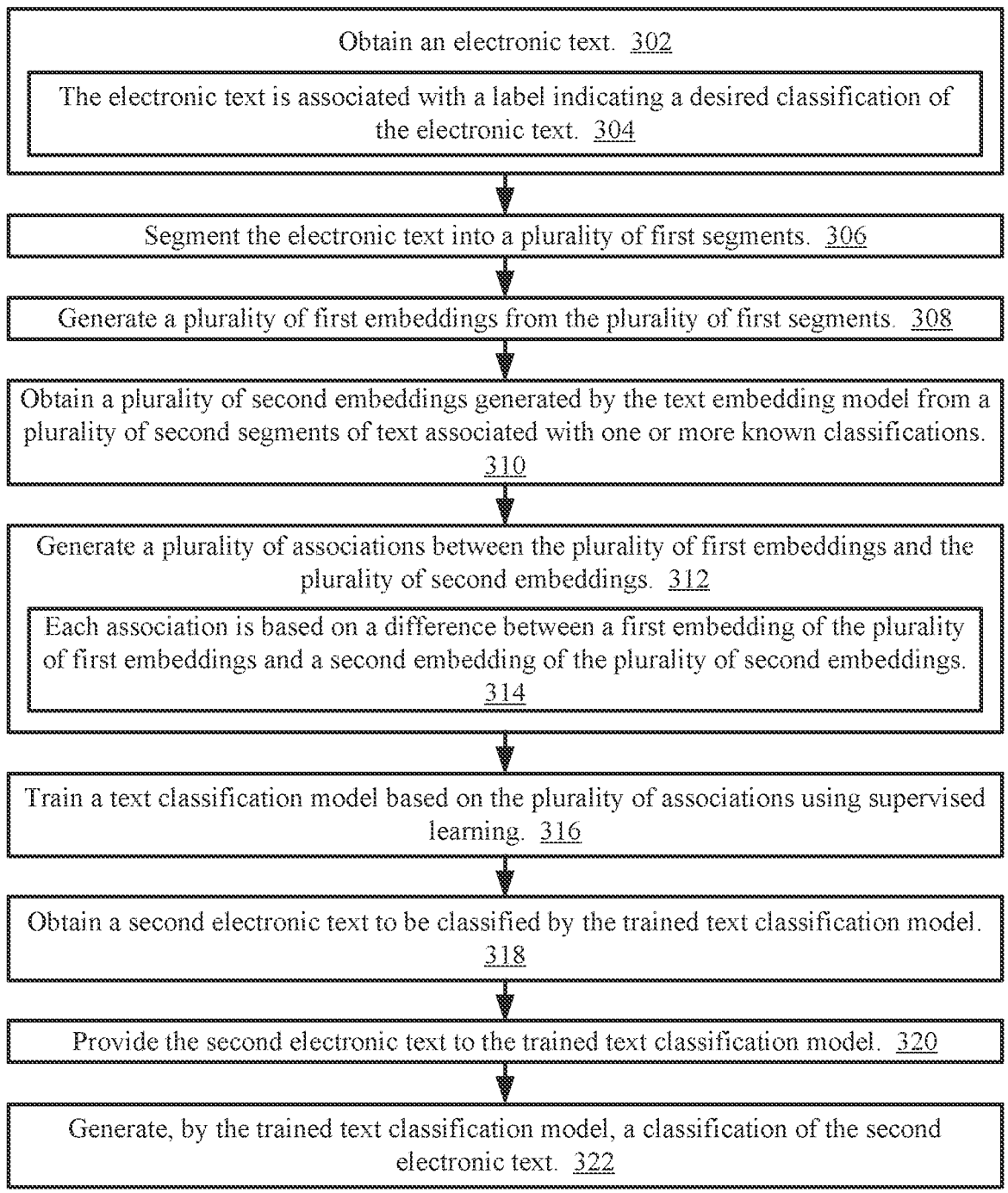
FIG. 3 shows an illustrative flow chart of an example operation of training and applying a text classification model, according to some implementations.

FIG. 2 shows an example block diagram 200 for training a text classification model 224, according to some implementations. In some implementations, the block diagram 200 is implemented in the system 100 depicted in FIG. 1. In block diagram 200, the text segmenter 204 may be an example implementation of the text segmenter 140 in FIG. 1, the text embedding model 208 may be an example implementation of the text embedding model 150 in FIG. 1, the embedding association model 218 may be an example embedding association model 160 in FIG. 1, the model trainer 222 may be an example implementation of the model trainer 170, and the text classification model 224 may be an example implementation of the text classification model 224. The semantic based list of sample text segments may be an example implementation of the list of sample segments stored in the database 120 or another suitable storage of the system 100 in FIG. 1. FIG. 2 is discussed below in combination with FIG. 3, wherein FIG. 3 shows an illustrative flow chart of an example operation 300 of training and applying a text classification model, according to some implementations. To note, the example operation 300 is described as being performed by the system 100 in FIG. 1, with the block diagram 200 being an example configuration of the system 100. In the example implementation, the text classification model 224 generates a categorization of a long text based on categorizations of long text segments of the long text.

At 302, the system 100 obtains an electronic text. In FIG. 2, the electronic text is a long text 202 that is longer than the input limit for the text classification model 224. In some implementations of obtaining the electronic text, the system 100 may receive the text via the interface 110 (such as by scraping a website or being provided text in a defined format from a user device or another device). The electronic text is associated with a label indicating a desired classification of the electronic text (304). For example, if the system 100 receives a text from a webpage, the system 100 may receive an indication of the desired classification from a user with knowledge of the webpage. In some implementations, the long texts to be used for training may have already been captured, and the desired classifications of the captured long texts may have already been determined. As such, the system 100 may receive a package of a plurality of long texts and desired classifications for use in training the text classification model 180.

At 306, the text segmenter 140 segments the electronic text into a plurality segments. For example, the text segmenter 204 segments one of the long texts from the package of long texts (such as long text 202) into a plurality of long text segments 206. In some implementations, the each of the long text segments 206 is of sentence length.

At 308, the text embedding model 150 generates a plurality of first embeddings from the plurality of first segments. For the text embedding model 150 to generate the plurality of first embeddings, for each first embedding of the plurality of first embeddings, the system 100 provides a first segment of the plurality of first segments to the text embedding model 150. The text embedding model 150 thus generates the first embedding based on the first segment. For example, for each long text segment 206, the text embedding model 208 generates a long text embedding 210. The embeddings may be generated iteratively, with the segments being provided to the text embedding model 150 in a one-by-one manner. Additionally or alternatively, the text embedding model 150 may be configured to receive a plurality of segments and generate a plurality of embeddings concurrently (such as the model being a multiple input multiple output type model or multiple instances of the text embedding model being used). In some implementations, the text embedding model is configured to generate a fixed size token vector from an input text segment. For example, the text embedding model 208 may be an NLP that tokenizes and vectorizes an input text to generate a fixed size embedding. In some implementations, the text embedding model 208 is a BERT model to generate embeddings.

At 310, the system 100 also obtains a plurality of second embeddings generated by the text embedding model 150 from a plurality of second segments of text associated with one or more known classifications. As noted above, the system 100 may store a list of sample segments associated with known semantics that impact the categorization of a text if the text includes those sample segments. For example, the semantic based list of sample text segments 212 may be stored (such as in database 120) and include the sample text segments 214 of a known semantic. In some implementations, the existence of the sample text segment 214 in the list 212 indicates a semantic that the sample text segments significantly impact classification. Each second segment of the plurality of second segments includes text associated with a known semantic to impact text classification for the text classification model 180, and each second segment is generated based on a domain knowledge of types of text to be classified by the text classification model 180. For example, if the categories into which the text classification model 180 is to classify text are known and there is knowledge of existing sentences that impact categorization, the sentences may be compiled based on that domain knowledge. As such, the list 212 may be manually compiled by subject matter experts or users providing text segments and their associated semantics. The compilation may occur at the system 100 or may occur separately, with the list then being provided to the system 100 via the interface 110. While not shown, the list 212 may also be updated with additional sample text segments 214 from previous long text segments identified as similar to other sample text segments by the embedding association model 218, with the long text segments included as sample text segments 214 in the list 212 and being associated with the same semantics (such as the semantic being a value of 1 based on the segment being included in the list 212).

In order for an embedding association model 218 to be able to associate long text embeddings 210 with sample text embeddings 216 based on a distance between those embeddings, the text embedding model 208 embeds the sample text segments 214 into the sample text embeddings 216 to be provided to the embedding association model 218. While FIG. 2 depicts the text embedding model 208 embedding the sample text segments 214 each time to generate the sample text embeddings for clarity, in application, the text embedding model 208 may embed each sample text segment 214 one time, with the sample text embedding that is generated being stored (such as in the list 212) and later used by the embedding association model 218. Similar to the embedding of the first segments (such as the long text segments 206) by the text embedding model 150, the system 100 may provide each second segment of the plurality of second segments to the text embedding model 150, and the text embedding model 150 generates the second embedding based on the second segment. As noted above, segments may be provided iteratively or concurrently to the model based on the configuration of the model. In some implementations, if the list of sample text segments is updated to include one or more additional sample text segments, the system 100 may generate and store the sample text embeddings for those additional segments at the time the segments are added.

At 312, the embedding association model 160 generates a plurality of associations between the plurality of first embeddings and the plurality of second embeddings. Each association is based on a difference between a first embedding of the plurality of first embeddings and a second embedding of the plurality of second embeddings (314). Referring to FIG. 2, the embedding association model 218 may generate associations between the long text embeddings 210 and the sample text embeddings 216. For a long text embedding 210, an association of the long text embedding 210 to a sample text embedding 216 is based on a difference between the embeddings. For example, the embedding association model 218 may calculate a distance between the token vectors that are the long text embedding 210 and the sample text embedding 216 (using any suitable distance measurement, such as a cosine similarity), and the association between the embeddings 210 and 216 may be based on the calculated distance. With the embeddings being normalized, calculating a distance between embeddings includes direct vector arithmetic (such as calculating the cosine similarity between normalized vectors). In some implementations, the embedding association model 218 calculates a distance between the long text embedding 210 and each of the sample text embeddings 216 and identifies an association between the long text embedding 210 and a specific sample text embedding 216 based on the smallest distance calculated across the plurality of sample text embeddings. Such calculations may be performed for each long text embedding 210 to attempt to associate each long text embedding 210 with a sample text embedding 216. With a first embedding (such as a long text embedding 210) and a second embedding (such as a sample text embedding 216) being associated, the first segment corresponding to the first embedding (such as the long text segment 206 corresponding to the long text embedding 210) and the second segment corresponding to the second embedding (such as the sample text segment 214 corresponding to the sample text embedding) are associated with each other. As such, the semantic associated with the sample text segment 214 may also be associated with the corresponding long text segment 206. The associated semantics 220 to the long text segments 206 provided by the embedding association model 218 may be provided as inputs for training the text classification model 224. The associated semantics 220 for a long text 202 may also be stored in a list of long text segments 206 and associated with the corresponding long text segment 206 for later use (such as by the system 100 to train the text classification model). The association of first embeddings (such as long text embeddings) and second embeddings (such as sample text embeddings) is described conceptually with reference to FIG. 4 below.

Figure 4:
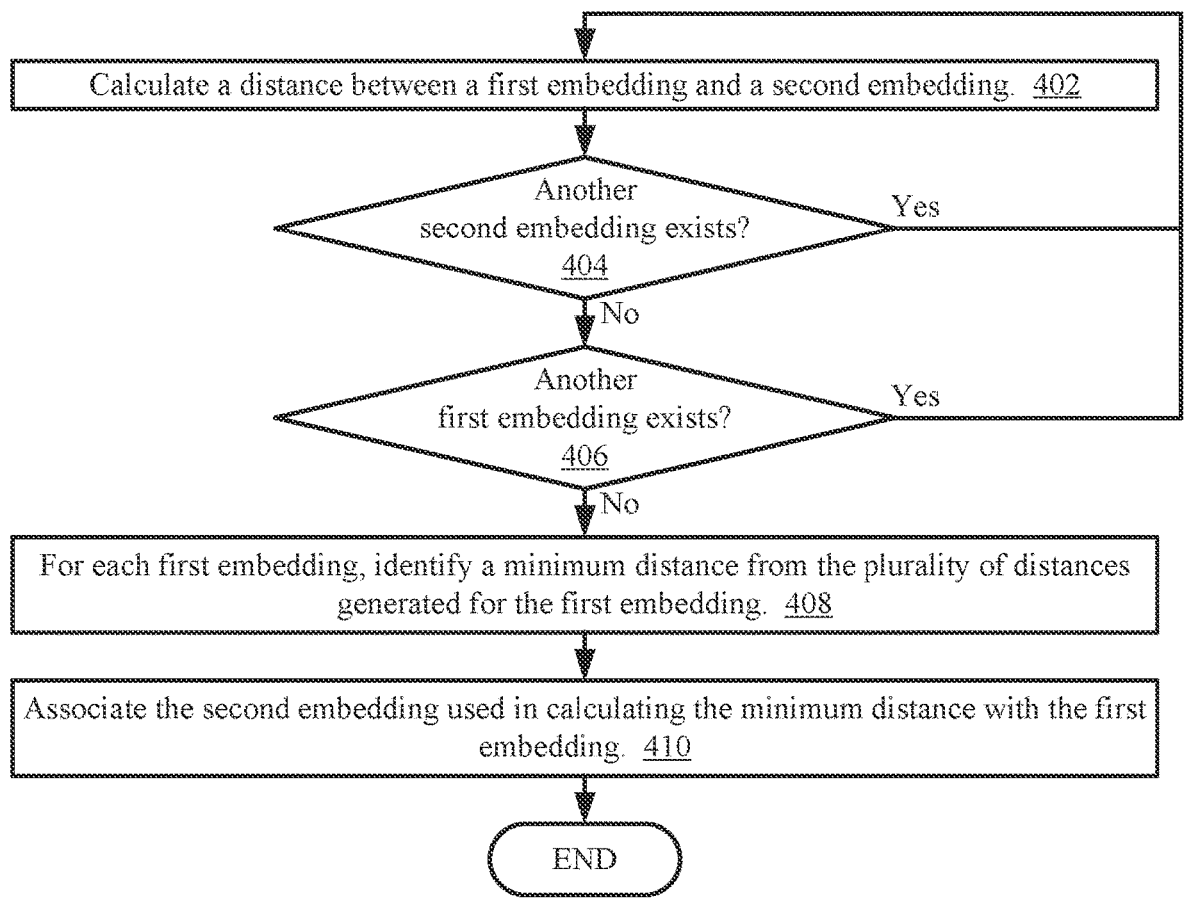
FIG. 4 shows an illustrative flow chart of an example operation of associating embeddings of text segments to be used for training the text classification model, according to some implementations.

FIG. 4 shows an illustrative flow chart of an example operation 400 of associating embeddings of text segments to be used for training the text classification model, according to some implementations. The example operation 400 is an example implementation of step 312 of the example operation 300 in FIG. 3 and is described as being performed by the system 100 (such as the embedding association model 160) in FIG. 1, with the block diagram 200 in FIG. 2 being an example configuration of the system 100. As depicted, the embedding association model 160 attempts to associate each first embedding (such as a long text embedding 210) with a second embedding (such as a sample text embedding 216).

At 402, the embedding association model 160 calculates a distance between a first embedding and a second embedding. For example, the text embedding model 208 may iteratively generate long text embeddings 210, with the text embedding model 208 generating a long text embedding 210 for each long text segment 206. The first long text embedding 210 may be provided to the embedding association model 218, and the embedding association model 218 may calculate a cosine similarity (or another suitable distance measure) between the first long text embedding 210 and a first sample text embedding 216. In some implementations, the long text embeddings 210 may be stored in a list after being generated by the text embedding model 208, and the sample text embeddings 216 may be stored in the semantic based list 212. The system 100 may retrieve the first long text embedding 210 from the list (such as from a first column), retrieve the first sample text embedding 216 from the list (such as from a first column), and provide the embeddings to the embedding association model 218 to calculate the distance.

At decision block 404, if another second embedding exists, the process reverts back to block 402, and the embedding association model 160 calculates a new distance between the first embedding and the next second embedding. For example, the system 100 may retrieve the next sample text embedding 216 in the list 212 (such as the next row down in the list) and provide the sample text embedding 216 to the embedding association model 218. The embedding association model 218 uses the same long text embedding 210 and the newly received sample text embedding 216 to calculate a new distance. Blocks 402 and 404 are repeated until a distance is calculated between the long text embedding 210 and each of the sample text embeddings 216. After a distance is calculated between the long text embedding 210 and each of the sample text embeddings 216 (and thus there are no more second embeddings at decision block 404), the process continues to decision block 406.

At decision block 406, if another first embedding for which distances are to be calculated exists, the process reverts back to block 402, with the embedding association model 218 calculating a distance between the next first embedding and each of the second embeddings. For example, once the system 100 is at the end of the semantic based list 212 including the sample text embeddings 216, the system 100 may go back and access the list including the long text embeddings 210, and retrieve the long text embedding 210 from the next row in the list. The system 100 may also again retrieve the sample text embeddings 216 from the list 212 in an iterative manner (with blocks 402 and 404 of operation 400 repeating until distances with all of the sample text embeddings 216 are calculated). In this manner, blocks 402-406 repeat until a distance is calculated for each combination between the long text embeddings 210 and the sample text embeddings 216. After a distance is calculated between the last long text embedding 210 and the last sample text embeddings 216 (and thus there are no more first embeddings at decision block 406), the process continues to block 408.

At 408, the embedding association model 160 identifies, for each first embedding, a minimum distance from the plurality of distances generated for the first embedding. For example, the embedding association model 218 identifies, for each long text embedding 210 for the long text 202, the smallest distance calculated across the sample text embeddings 216. At 410, the embedding association model 160 associates the second embedding used in calculating the minimum distance with the first embedding. For example, the embedding association model 218 associates the sample text embedding 216 used in calculating the minimum distance for the long text embedding 210 with the long text embedding 210. In this manner, each long text embedding 210 may be associated with one of the sample text embeddings 216, and the process in FIG. 2 ends. A long text embedding and a sample text embedding being most similar indicates that the sample text embedding is the closest to the long text embedding from all of the sample text embeddings, and thus the corresponding segments for the two embeddings are most similar across all sample text embeddings. As such, the embedding association model 218 may associate the semantic associated with the sample text embedding 216 with the long text embedding 210. For example, as noted above and described in more detail below, a distance may be calculated between the long text embedding and the sample text embedding, and the measurement of the distance may be used as a semantic of the long text embedding (e.g., indicating a portion or percentage that the long text segment impacts classification as compared to the matched sample text segment).

Regarding the association of embeddings and the association of semantics to long text embeddings, the calculations to perform such associations may be included in the embedding association model 160 as computer readable code in the Python programming language, such as using the NumPy library, built-in mathematical functions, or another suitable math library to perform vector or matrix arithmetic. In mathematical terms of an example implementation of associating embeddings (and thus segments) and generating semantics for the long text segments, assume that X is a long text desired to be classified (such as long text 202 in FIG. 2). In addition, assume that the text embedding model is implemented as an application or function M (with the output embeddings from M being normalized). Further, assume that the list of sample text segments is C, with each sample text segment being $c_j$ for j from 1 to h (with h being the number of sample text segments in the list). Additionally, assume that the long text is segmented into a plurality of long text segments $x_i$ for i from 1 to k (with k being the number of long text segments in the long text).

The system 100 calculates $M(c_j)$ to generate embedding $a_j$ across j as a normalized, fixed size vector, and the system 100 also calculates $M(x_i)$ to generate embedding $b_i$ across i as a normalized, fixed size vector. In some implementations, the system 100 generates a matrix A of $a_1$ through $a_h$ (i.e., A=[$a_1$, $a_2$, . . . , $a_h$]). The size of matrix A may be a number of rows equal to the number of embeddings a (i.e., h) and a number of columns equal to the embedding size that the model M is configured to generate. For example, if the list of sample text segments includes 200 segments (thus including 200 embeddings) and the model M is configured to generate embeddings that are normalized vectors of 64 values in size, matrix A may be of size 200×64.

The system 100 may also generate a matrix B of $b_1$ through $b_k$ (i.e., B=[$b_1$, $b_2$, . . . , $b_k$]). Similar to the size of matrix A, the size of matrix B may be a number of rows equal to the number of embeddings b (i.e., k) and a number of columns equal to the embedding size that the model M is configured to generate (with the number of columns between matrices A and B being the same). For example, if the long text is segmented into 100 segments (thus resulting in 100 embeddings) and the model M is configured to generate embeddings that are normalized vectors of 64 values in size, matrix B may be of size 100×64. Referring to FIG. 2, the sample text embeddings 216 may be included in a matrix A, and the long text embeddings 210 may be included in a matrix B.

In some implementations of calculating a distance between each of the first embeddings (such as the long text embeddings 210) and each of the second embeddings (such as the sample text embeddings 216), the embedding association model 160 may calculate a dot product of matrix B and the transpose of matrix A to generate a resulting matrix C, such as depicted in equation (1) below:

$$C = B \cdot A^T \qquad (1)$$

Since the text embedding model 140 generates embeddings of a fixed size, the column size of matrices A and B are the same. If A is transposed, then the column size of A is the same as the row size of B (which is the fixed size of embeddings), thus allowing to calculate a dot product between the two matrices to generate the resulting matrix C. The resulting matrix C includes a number of rows equal to the number of rows in B (i.e., k) and a number of columns equal to the number of rows in A (i.e., h) to thus be of size k×h, and each cell of matrix C is associated with a unique pairing of an embedding a with an embedding b (i.e., $c_{ji}$ is associated with the combination of embedding $a_j$ and embedding $b_i$). In performing equation (1) above, the system 100 calculates a scalar between each combination of embeddings a and b across matrices A and B, respectively, with the scalar being associated with a distance between the embeddings a and b. To note, in performing equation (1) above, similar vectors would result in a larger scalar than dissimilar vectors. As such, the value of each cell $c_{ji}$ in matrix C across j and i is a scalar that is inversely related to the distance between embedding $a_j$ and embedding $b_i$ (i.e., a larger scalar value corresponds to a smaller distance between embeddings). Referring to FIG. 2, each row of the matrix C corresponds to a long text embedding 210, and each column of the matrix C corresponds to a sample text embedding 216. As such, the cell values in a row corresponding to a long text embedding 210 represent (in an inverse relationship) the distances between the long text embedding 210 and each of the sample text embeddings 216. With the embeddings being normalized (such as the vectors having values on a scale from 0 to 1), the resulting scalar value in each cell of matrix C may be on a scale from 0 to 1 (with 0 indicating that the two embeddings are completely dissimilar and 1 indicating that the two embeddings are the same).

As noted above, the embedding association model 160 identifies, for each first embedding of the plurality of first embeddings (such as a long text embedding), the minimum distance from the plurality of distances generated for the first embedding. As noted above, the scalar values in the resulting matrix C are inversely related to the distance between embeddings. As such, to identify the minimum distance, the system 100 may perform a max aggregate function along one axis of the resulting matrix C to identify the maximum value (which corresponds to the minimum distance). In particular, for each long text embedding, the system 100 may execute the built-in max( ) function in the Python programming language to the corresponding row in matrix C (including the values along the row), to output the maximum value that exists in the row (thus indicating the sample text embedding that is closest in distance to the long text embedding). With the max( ) function being executed for each row in matrix C and each row in matrix C being associated with a long text segment, the system 100 (such as the embedding association model 160) may generate a vector D of maximum values, with each maximum value in the vector corresponding to a long text embedding and being associated with the sample text embedding that is closest to the long text embedding. In other words, for k number of long text segments x in the long text X, vector D equals $[d_1, d_2, \ldots, d_k]$, with $d_r$ being the semantic (i.e., the maximum value corresponding to the minimum distance) for long text segment $x_r$. The system 100 may store vector D of associated semantics 220 in the database 120, such as in the list or data object for the long text 202.

A sample text segment 214 being included in the semantic based list 212 may infer that the value that would be used for its semantic may be 1 (i.e., the sample text segment 214 would directly impact classification of a text including the sample text segment). If the semantics calculated for the long text segments 206 using the max( ) function are on a scale from 0 to 1, the semantic associated with a long text segment 206 may indicate a percentage or proportion that the long text segment 206 would impact classification of the long text 202 as compared to the impact any of the sample text segments 214 would impact classification if the long text 202 included any of the sample text segments 214. As such, an associated semantic 220 of a long text segment 206 may be conceptualized as a weight that is to be provided as a context input to the text classification model 224 for classifying the long text segment 206.

With the long text segments 206 generated by the text segmenter 204 and the associated semantics 220 generated for the long text segments 206, the long text segments 206 and the associated semantics 220 are provided to the model trainer 222 to train the text classification model 224. As depicted in FIG. 2, the long text label 226 indicating the desired classification of the long text 202 is also provided to the model trainer 222 in order to perform supervised learning to train the text classification model 224 and thus generate the trained text classification model 228.

Referring back to FIG. 3, the model trainer 170 trains the text classification model 180 based on the plurality of associations between the first embeddings (e.g., the long text embeddings 210) and the second embeddings (e.g., the sample text embeddings 216). While FIG. 2 and FIG. 3 depict one long text being processed to generate associations (e.g., the associated semantics 220) for clarity, the system 100 may process a plurality of long texts to have a sufficient size training data for training the text classification model 180. For example, the components 204, 208, and 218, may be used to segment and generate associated semantics for hundreds or even thousands of long texts so that the text model trainer 222 may have hundreds or thousands of data points for a loss function in order to train the text classification model 224. As noted above, supervised learning may be performed to train the text classification model, with each long text to be used for the training data being associated with a label indicating the desired categorization for the long text. Training of the text classification model is described with reference to FIG. 5 below.

Figure 5:
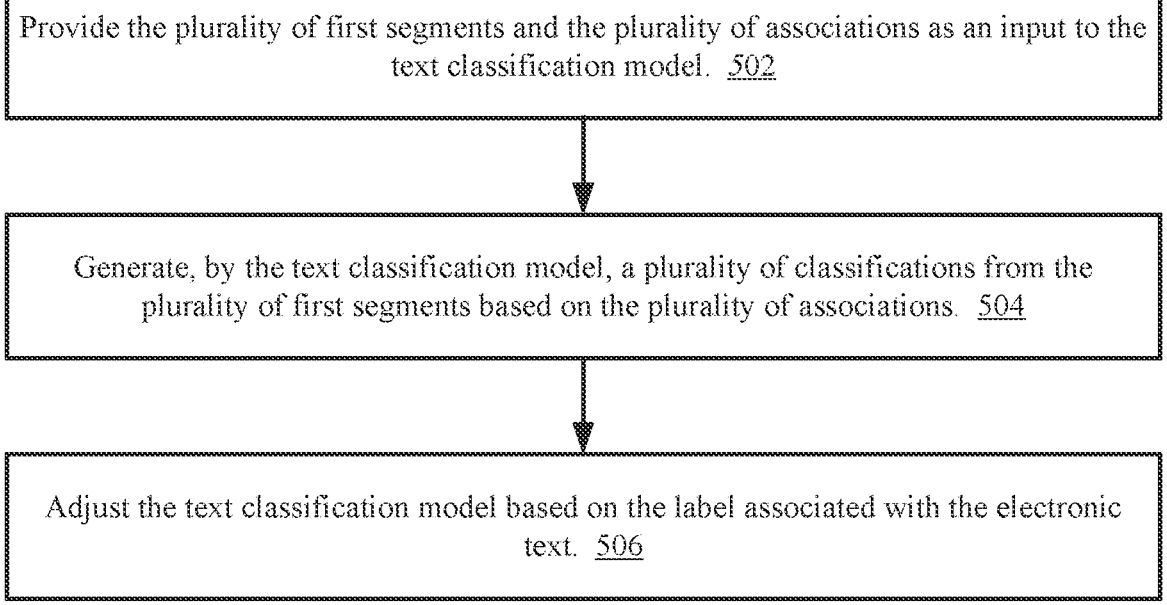
FIG. 5 shows an illustrative flow chart of an example operation of performing supervised learning to train the text classification model, according to some implementations.

FIG. 5 shows an illustrative flow chart of an example operation 500 of performing supervised learning to train the text classification model, according to some implementations. Operation 500 is an example implementation of block 316 of operation 300 depicted in FIG. 3, and is described as being performed by the system 100 in FIG. 1 having the example configuration 200 in FIG. 2 (such as by the model trainer 170 or the model trainer 222).

At 502, the system 100 provides the plurality of first segments and the plurality of associations as an input to the text classification model 180. For example, in FIG. 2, the model trainer 222 may receive and provide the plurality of long text segments 206 and the plurality of associated semantics 220 to the text classification model 224 to generate a plurality of categorizations for the long text segments 206. In the above example of the long text being X and the long text segments being $x_i$ for i from 1 to k, the model trainer 222 may provide the long text segments $x_1$ through $x_k$ to the text classification model as a text input, and the model trainer 222 may concurrently provide the scalar value semantics $d_1$ through $d_k$ of vector D as a context input to the text classification model.

At 504, the text classification model 180 generates a plurality of classifications from the plurality of first segments based on the plurality of associations. For example, the text classification model 224 generates a first classification for a first long text segment $x_1$ and based on the corresponding semantic $d_1$, a second classification for a second long text segment $x_2$ and based on the corresponding semantic $d_2$, a third classification for a third long text segment $x_3$ and based on the corresponding semantic $d_3$, and so on to a kth classification for a kth long text segment $x_k$ and based on the corresponding semantic $d_k$. In some implementations, the text classification model 224 iteratively receives a long text segment 206 and its associated semantic 220 and generates a classification until all of the long text segments 206 for the long text 202 have been provided to the text classification model 224. Alternatively, the text classification model 224 may be configured to concurrently receive a plurality of long text segments 206 and their associated semantics 220 as inputs to generate the plurality of classifications. As noted above, in some implementations, the text classification model 180 is a decision tree classifier, with the text classification model 180 configured to generate a classification for the overall long text (such as by including post processing after the decision tree classifier to combine all of the categorizations of the long text segments to generate a classification for the overall text). As such, the text classification model 224 uses the plurality of categorizations to generate an overall categorization of the long text 202.

As noted above, a plurality of long texts may be processed by the components 204, 208, and 218 for the text classification model 224 to generate a plurality of classifications for the plurality of long texts and thus be trained using the plurality of long texts as training data. Each of the long texts is associated with a label indicating the desired classification of the long text, with the label being stored at the system 100 (such as in the list for the long text in the database 120). Such long text labels 226 are thus provided to the model trainer 222 to train the text classification model 224 using supervised learning. For supervised learning, any suitable loss function may be used by the model trainer. For example, the model trainer 222 may implement a squared loss function or an absolute loss function to measure the error between the plurality of desired classifications indicated by the long text labels 226 for the plurality of long texts 202 and the plurality of actual classifications generated by the text classification model 224 for the long texts 202.

At 506, the model trainer 170 adjusts the text classification model 180 based on the label associated with the electronic text. For example, the error from the loss function is based on the difference between the labels indicating the desired classifications and the actual classifications generated by the text classification model 224. As such, the model trainer 222 may adjust one or more hyperparameters of the text classification model 224 in an attempt of the text classification model 224 changing one or more of the actual classifications so that the error generated by the loss function decreases. While not depicted in FIG. 5, steps 502-506 may be recursively performed to attempt to reduce the error from the loss function to a desired amount (such as based on the Adam optimization algorithm or another suitable optimization algorithm to determine when to stop adjusting the text classification, thus completing training of the text classification model). After the final adjustments to the text classification model, the text classification model is trained and ready to be used for classifying new texts that are not part of the training data.

Referring back to FIG. 3, with the text classification model 180 trained, the system 100 obtains a second electronic text to be classified by the trained text classification model 180 (318). For example, the system 100 may receive (such as via the interface 110) text scraped from a new webpage, with the trained text classification model 180 to classify the text and identify whether the text includes an error.

At 320, the system 100 provides the second electronic text to the trained classification model 180. In some implementations, the text segmenter 140 segments the second electronic text into segments (such as sentences), the text embedding model 150 embeds each of the segments, and the embedding association model 160 associates the embeddings with the sample embeddings stored for the sample segments to generate the associated semantics for the segments of the second electronic text. As such, the segments of the second electronic text and the associated semantics may be provided to the trained text classification model 180.

At 322, the trained text classification model 180 generates a classification of the second electronic text. For example, the trained text classification model 180 may generate a classification for each of the segments of the second electronic text provided to the trained text classification model 180, with each classification also based on the associated semantic provided to the trained classification model 180 for the segment. The trained classification model 180 may thus generate the classification of the second electronic text based on the classifications of the segments of the second electronic text (such as by combining the classifications for the segments).

To note, the text classification model 180 may be retrained as needed or desired. In some implementations, the system 100 may be configured to retrain the text classification model 180 after an update to the list of the sample texts or an update to the group of long texts that are to be used for training data. For example, a user may provide feedback that a categorization by the text classification model 180 of a long text is incorrect, and the system 100 may store the feedback for use in retraining the model. If the feedback indicating an incorrect classification reaches a threshold number of percentage, the system 100 may use the feedback as labels for those long texts (with the feedback indicating or inferring the desired categorization of the long text), and those long texts may be included in the training data to retrain the text classification model 180 (such as described above).

As described herein, an improved text classification model is configured and trained to classify long texts longer than the text input to the model, with the training of the model being based on known semantics of segments that impact classification. As a result, the improved text classification model is able to classify any length text, with the model's accuracy improved over typical classification models as a result of training the model using domain knowledge manifested in the semantics of the text segments.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c. In addition, the term "document" may be used interchangeably with "electronic document" or "computer readable document" based on how used above.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer readable medium. The processes of a method or algorithm disclosed herein may be implemented in a processor-executable software module which may reside on a computer readable medium. Computer readable media includes both computer storage media and communication media including any medium that can be enabled to transfer a computer program from one place to another. A storage media may be any available media that may be accessed by a computer. By way of example, and not limitation, such computer readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer readable media. Additionally, the operations of a method or algorithm may reside as one or any combination or set of codes and instructions on a machine readable medium and computer readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for training a text classification model, the method comprising:
   obtaining an electronic text, wherein the electronic text is associated with a label indicating a desired classification of the electronic text;
   segmenting the electronic text into a plurality of first segments;
   generating, by a text embedding model, a plurality of first embeddings from the plurality of first segments;
   obtaining a plurality of second embeddings generated by the text embedding model from a plurality of second segments of text associated with one or more known classifications;
   generating a plurality of associations between the plurality of first embeddings and the plurality of second embeddings, wherein each association is based on a difference between a first embedding of the plurality of first embeddings and a second embedding of the plurality of second embeddings;
   training a text classification model based on the plurality of associations using supervised learning, including:
      providing the plurality of first segments and the plurality of associations as an input to the text classification model;
      generating, by the text classification model, a plurality of classifications from the plurality of first segments based on the plurality of associations; and
      adjusting the text classification model based on the label associated with the electronic text;
   obtaining a second electronic text to be classified by the trained text classification model;
   providing the second electronic text to the trained text classification model; and
   generating, by the trained text classification model, a classification of the second electronic text.

2. The method of claim 1, wherein:
   the plurality of second segments include an electronic list of second segments; and
   each second segment of the list of second segments:
   includes text associated with a known semantic to impact text classification; and
   is generated based on a domain knowledge of types of text to be classified by the text classification model.

3. The method of claim 1, wherein generating the plurality of first embeddings includes, for each first embedding of the plurality of first embeddings:
  providing a first segment of the plurality of first segments to a text embedding model; and
  generating, by the text embedding model, the first embedding based on the first segment.

4. The method of claim 3, further comprising generating, by the text embedding model, the plurality of second embeddings, wherein:
  generating the plurality of second embeddings includes, for each second embedding of the plurality of second embeddings:
    providing a second segment of the plurality of second segments to a text embedding model; and
    generating, by the text embedding model, the second embedding based on the second segment.

5. The method of claim 1, wherein generating a plurality of associations between the plurality of first embeddings and the plurality of second embeddings includes, for each first embedding of the plurality of first embeddings:
  calculating a distance between the first embedding and each second embedding of the plurality of second embeddings; and
  identifying a minimum distance from the plurality of distances generated for the first embedding, wherein the second embedding used in calculating the minimum distance is associated with the first embedding.

6. The method of claim 5, wherein:
  the plurality of first embeddings include a first matrix of first embeddings, wherein:
    each row of the matrix of first embeddings includes a first embedding of the plurality of first embeddings; and
    the first embeddings are normalized;
  the plurality of second embeddings include a second matrix of second embeddings, wherein:
    each row of the matrix of second embeddings includes a second embedding of the plurality of second embeddings; and
    the second embeddings are normalized;
  calculating a distance between the first embedding and each second embedding for each first embedding of the plurality of first embeddings includes calculating a dot product of the second matrix and a transpose of the first matrix to generate a resulting matrix including a value for each cell corresponding to a row and a column of the resulting matrix, wherein the value is associated with a distance between a first embedding and a second embedding associated with the row and the column in the resulting matrix; and
  identifying the minimum distance from the plurality of distances generated for the first embedding for each first embedding of the plurality of first embeddings includes performing a max aggregate function along one axis of the resulting matrix to generate a vector of maximum values, wherein each maximum value identifies, for a first embedding associated with the maximum value, the second embedding to be associated with the first embedding.

7. The method of claim 1, wherein:
  each first segment of the plurality of first segments is a sentence; and
  each second segment of the plurality of second segments is a sentence.

8. The method of claim 1, wherein the text embedding model includes a Bidirectional Encoder Representations from Transformers (BERT) model.

9. The method of claim 1, wherein the text classification model is a decision tree classifier.

10. The method of claim 1, wherein:
  each second segment of the plurality of second segments is associated with an error message that may appear in web pages; and
  the text classification model is to classify electronic text in a web page to identify one or more error messages existing on the web page.

11. A system for training a text classification model, the system comprising:
  one or more processors; and
  a memory storing instructions that, when executed by the one or more processors, causes the system to perform operations comprising:
    obtaining an electronic text, wherein the electronic text is associated with a label indicating a desired classification of the electronic text;
    segmenting the electronic text into a plurality of first segments;
    generating, by a text embedding model, a plurality of first embeddings from the plurality of first segments;
    obtaining a plurality of second embeddings generated by the text embedding model from a plurality of second segments of text associated with one or more known classifications;
    generating a plurality of associations between the plurality of first embeddings and the plurality of second embeddings, wherein each association is based on a difference between a first embedding of the plurality of first embeddings and a second embedding of the plurality of second embeddings;
    training a text classification model based on the plurality of associations using supervised learning, including:
      providing the plurality of first segments and the plurality of associations as an input to the text classification model;
      generating, by the text classification model, a plurality of classifications from the plurality of first segments based on the plurality of associations; and
      adjusting the text classification model based on the label associated with the electronic text;
    obtaining a second electronic text to be classified by the trained text classification model;
    providing the second electronic text to the trained text classification model; and
    generating, by the trained text classification model, a classification of the second electronic text.

12. The system of claim 11, wherein:
  the plurality of second segments include an electronic list of second segments; and
  each second segment of the list of second segments:
    includes text associated with a known semantic to impact text classification; and
    is generated based on a domain knowledge of types of text to be classified by the text classification model.

13. The system of claim 11, wherein generating the plurality of first embeddings includes, for each first embedding of the plurality of first embeddings:
  providing a first segment of the plurality of first segments to a text embedding model; and generating, by the text embedding model, the first embedding based on the first segment.

14. The system of claim 13, wherein the operations further comprise generating, by the text embedding model, the plurality of second embeddings, wherein:
generating the plurality of second embeddings includes, for each second embedding of the plurality of second embeddings:
providing a second segment of the plurality of second segments to a text embedding model; and
generating, by the text embedding model, the second embedding based on the second segment.

15. The system of claim 11, wherein generating a plurality of associations between the plurality of first embeddings and the plurality of second embeddings includes, for each first embedding of the plurality of first embeddings:
calculating a distance between the first embedding and each second embedding of the plurality of second embeddings; and
identifying a minimum distance from the plurality of distances generated for the first embedding, wherein the second embedding used in calculating the minimum distance is associated with the first embedding.

16. The system of claim 15, wherein:
the plurality of first embeddings include a first matrix of first embeddings, wherein:
each row of the matrix of first embeddings includes a first embedding of the plurality of first embeddings; and
the first embeddings are normalized;
the plurality of second embeddings include a second matrix of second embeddings, wherein:
each row of the matrix of second embeddings includes a second embedding of the plurality of second embeddings; and
the second embeddings are normalized;
calculating a distance between the first embedding and each second embedding for each first embedding of the plurality of first embeddings includes calculating a dot product of the second matrix and a transpose of the first matrix to generate a resulting matrix including a value for each cell corresponding to a row and a column of the resulting matrix, wherein the value is associated with a distance between a first embedding and a second embedding associated with the row and the column in the resulting matrix; and
identifying the minimum distance from the plurality of distances generated for the first embedding for each first embedding of the plurality of first embeddings includes performing a max aggregate function along one axis of the resulting matrix to generate a vector of maximum values, wherein each maximum value identifies, for a first embedding associated with the maximum value, the second embedding to be associated with the first embedding.

17. The system of claim 11, wherein:
each first segment of the plurality of first segments is a sentence; and
each second segment of the plurality of second segments is a sentence.

18. The system of claim 11, wherein the text embedding model includes a Bidirectional Encoder Representations from Transformers (BERT) model.

19. The system of claim 11, wherein the text classification model is a decision tree classifier.

20. The system of claim 11, wherein:
each second segment of the plurality of second segments is associated with an error message that may appear in web pages; and
the text classification model is to classify electronic text in a web page to identify one or more error messages existing on the web page.

* * * * *